Jan. 5, 1926.
V. J. HARRIS
PISTON PIN
Filed Oct. 1, 1925
1,568,833
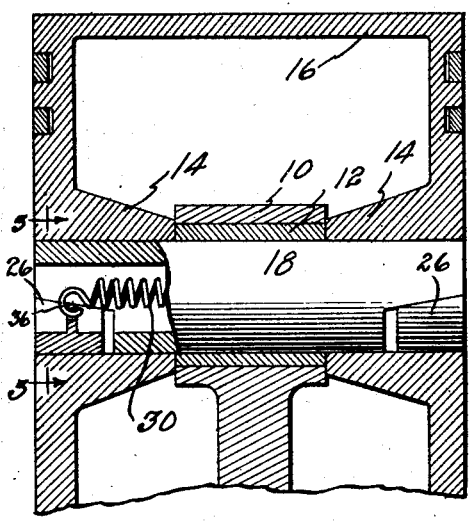
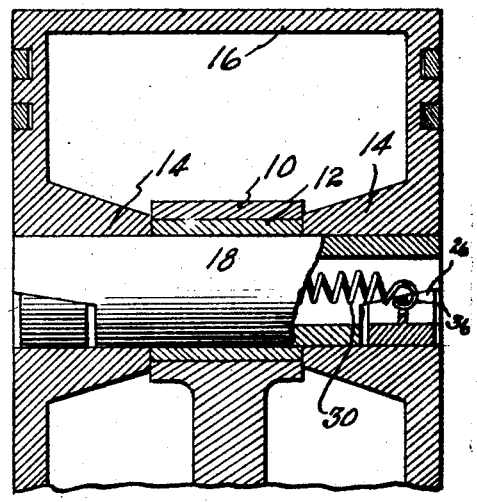
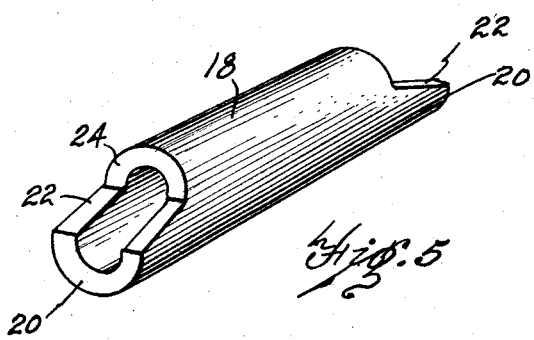
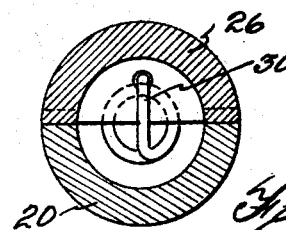
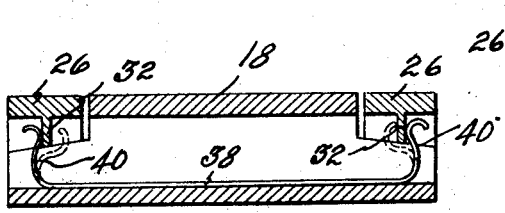
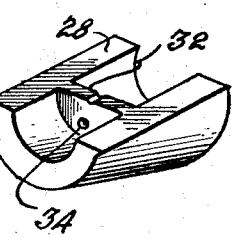
INVENTOR.
Vernon J. Harris
BY Parker + Burton
ATTORNEY.

Patented Jan. 5, 1926.

1,568,833

UNITED STATES PATENT OFFICE.

VERNON J. HARRIS, OF CLEVELAND, OHIO.

PISTON PIN.

Application filed October 1, 1925. Serial No. 59,833.

*To all whom it may concern:*

Be it known that I, VERNON J. HARRIS, a citizen of the United States, residing at Cleveland, county of Cuyahoga, State of Ohio, have invented a certain new and useful Improvement in Piston Pins, and declare the following to be a full, clear, and exact description of the same, such as will enable others skilled in the art to which it pertains to make and use the same, reference being had to the accompanying drawings, which form a part of this specification.

My invention relates to improvements in piston pins and other pivot bearing pins of a similar character of the type provided with expansible end bearing portions.

An object is to provide a simple, inexpensive, positively operating pin of the character described having end bearing portions adapted to automatically conform to an oversize diameter of the bearings within which such ends are mounted in order to take up for wear and prevent play of the bearing parts.

An important use of my improved pin is in replacement practice in which it is necessary that the pin so seat itself in the bearings as to prevent any loose play at such points, and a meritorious feature of my improved construction resides in the provision of a pin body having expansible end portions adapted to automatically accommodate themselves to the bearings within which they are mounted and comprising end extensions integral with the tubular body of the pin and complementary end portions movably seated upon said extensions, held thereon by means extending through the tubular body of the pin which exerts tension on said movable end portions causing them to travel over the end extensions of the pin body to increase the diameter of the end bearing portions of the pin.

An important advantage in a pin of the character set forth consists in the employment of a tubular pin body having semi-tubular end extensions provided with inner faces inclined from the end of the body to a radial shoulder and independent semi-tubular complementary end portions seated on said end extensions of the body and having inclined meeting faces which are held yieldably inwardly toward each other by a spring extending through the body to increase the diameter of the end bearing portions of the pin.

The above objects and advantages together with others of merit and importance will more fully appear from the following specification, appended claims and accompanying drawing, in which:

Figure 1 is a vertical sectional view through a piston and connecting rod provided with my improved piston pin partly broken away.

Fig. 2 is a similar vertical sectional view showing my piston pin broken away at a different point.

Fig. 3 is a vertical sectional view through my improved pin taken on line 3—3, Fig. 1.

Fig. 4 is a perspective of a movable end bearing portion of my improved pin.

Fig. 5 is a perspective of the body portion of my improved pin.

Fig. 6 is a longitudinal sectional view through my improved pin showing a modified type of spring.

An important use for my improved type of pin is in piston pins and I have here shown my improvement as embodied in a piston pin in which the pin is carried by a connecting rod 10 provided with a bushing 12 and the end portions of the pin are mounted within bearings 14 of a piston 16. In practice wear naturally occurs at the bearing points and more or less looseness and play is developed in operation which produces a wobble of the piston and unsatisfactory working conditions. This situation becomes more troublesome as time goes on and the practice of replacing piston pins is a common and wide-spread one.

I intend to provide a piston pin of simple construction and the minimum number of parts adapted to automatically take up for wear at its bearing ends and of a character easily handled in that the entire pin forms a unitary assembly.

My improved pin comprises a tubular body portion 18, the ends of which have been cut away to provide integral semi-tubular end extensions 20 having inner faces 22 inclined from the end of the body to a radial shoulder 24. Each semi-tubular end extension is provided with a semi-tubular complementary end portion 26 movably seated upon the end extension and having inclined meeting faces 28. These movable end portions 26 are held in position upon the end extensions of the body and yieldably toward each other to increase the diameter of the end bearing portions of the pin and by suitable means extending through the tubular body of the pin.

I have shown in Figs. 1 and 2 a coil spring 30 extending through the tubular body of the pin and having its ends connected to the end portions 26, holding them under yieldable tension toward each other to expand the pin at the ends. I have shown each end portion 26 provided with an inwardly projecting lug or radial wall 32 perforated at 34 to permit engagement of the end 36 of the spring therewith.

In Fig. 6 I have shown a modified form of construction in which a flat spring 38 is provided with turned-up ends 40 which engage the radial walls 32 of the movable end portions 26 to hold such movable end portions toward each other in the same manner as it is shown in Figs. 1 and 2. The normal unsprung position of this spring is shown in dotted outline in Fig. 6.

The springs 30 or 38 hold the detachable movable end bearing portions 26 normally upon their seats on the end extensions of the pin body so that the entire pin assembly may be handled as a unit in merchandising the article or in assembling it, and the inclined meeting faces are at such an angle to the axis of the pin that the movable end portions retain any position to which they have been moved upon the end extensions of the pin body under a radial pressure exerted thereon by the bearing within which the pin is mounted.

What I claim is:

1. In a pin having radially expansible end portions, a tubular body having semi-tubular end extensions provided with inner faces inclined to the axis of the body, complementary semi-tubular end parts provided with inclined meeting faces and being movably disposed on said end extensions, and a spring extending through the tubular body connecting said movably disposed end parts holding them in place on the end extensions under constraint to travel over the inclined faces of the extensions to increase the diameter of the end portions of the pin.

2. In a pin having radially expansible end portions, a cylindrical body having end extensions, a complementary end part movably disposed on each end extension, said extensions and movable end parts having inclined meeting faces whereby longitudinal travel of a movable part over an end extension in a given direction increases the diameter of the end portion of the pin, and means exerting constant tension on said movable end parts to produce such movement.

3. In a pin having radially expansible end portions, a tubular body having end extensions, complementary end parts one movably mounted on each end extension of the body, said extensions and movable end parts having inclined meeting faces whereby longitudinal travel of a movable part over an end extension in a given direction increases the combined diameter of the end portion of the pin, and a spring extending through the tubular body connecting said movable end parts holding them in place on the end extensions yieldably toward each other to travel over the inclined faces of the extensions to increase the diameter of each end portion of the pin 4. A pin of the class described, comprising a tubular body having semi-tubular end extensions provided with inner faces each inclined from an end of the pin to a radial shoulder, a complementary semi-tubular end part having an inclined meeting face movably seated on each end extension to travel longitudinally thereover increasing the diameter of the end portion of the pin, and a spring extending through the tubular body of the pin engaging said movable end parts exerting constraint thereon to hold them yieldably against the inclined face of the end extensions to increase the diameter of the end portions of the pin.

5. A pin of the class described, comprising a tubular body having semi-tubular end extensions provided with inner faces inclined from the axis of the body, a complementary semi-tubular end part having an inclined meeting face seated on each end extension and movable longitudinally thereover to increase the diameter of the end portion of the pin, each complementary semi-tubular end part provided with an internally projecting lug, and a spring extending through the tubular body engaging said lugs exerting yieldable tension on said movable end parts to cause them to travel over said end extensions to increase the diameter of the end portions of the pin.

In testimony whereof, I sign this specification.

VERNON J. HARRIS.